(12) United States Patent
Kilian-Kehr et al.

(10) Patent No.: US 7,603,466 B2
(45) Date of Patent: Oct. 13, 2009

(54) MOBILE COLLABORATIVE PEER-TO-PEER BUSINESS APPLICATIONS

(75) Inventors: Roger Kilian-Kehr, Darmstadt (DE); Jochen Haller, Karlsruhe (DE)

(73) Assignee: SAP (AG), Walldorf (DE)

( * ) Notice: Subject to any disclaimer, the term of this patent is extended or adjusted under 35 U.S.C. 154(b) by 921 days.

(21) Appl. No.: 10/894,747

(22) Filed: Jul. 19, 2004

(65) Prior Publication Data
US 2006/0015562 A1 Jan. 19, 2006

(51) Int. Cl.
 *G06F 15/16* (2006.01)
(52) U.S. Cl. .......................... 709/227; 709/219
(58) Field of Classification Search .......... 709/206, 709/227; 717/103, 171–173
See application file for complete search history.

(56) References Cited

U.S. PATENT DOCUMENTS

| 7,206,841 | B2* | 4/2007 | Traversat et al. ............. 709/225 |
| 7,233,979 | B2* | 6/2007 | Dickerman et al. .......... 709/218 |
| 7,310,532 | B2* | 12/2007 | Knauerhase et al. ..... 455/456.1 |
| 7,328,243 | B2* | 2/2008 | Yeager et al. ................ 709/205 |
| 7,363,343 | B2* | 4/2008 | Bucher ........................ 709/205 |
| 7,441,032 | B2* | 10/2008 | Costa Requena ............ 709/225 |
| 2004/0019645 | A1* | 1/2004 | Goodman et al. ........... 709/206 |
| 2004/0064512 | A1* | 4/2004 | Arora et al. ................. 709/206 |
| 2005/0033806 | A1* | 2/2005 | Harvey et al. ............... 709/204 |
| 2005/0058108 | A1* | 3/2005 | Ekberg et al. ................ 370/338 |
| 2006/0026168 | A1* | 2/2006 | Bosworth et al. ............. 707/10 |

OTHER PUBLICATIONS

"Sharing an Outlook Calendar"; Boston University Medical Campus Help Desk; Dated Nov. 5, 2001, retrieved via http://www.bumc.bu.edu/Dept/Content.aspx?DepartmentID=308&PageID=5403 on Jul. 3, 2008; pp.1-8.*

Chen, Qiming, et al., "Peer-to-Peer Collaborative Internet Business Servers", Software Technology Laboratory; HP Laboratories Palo Alto; HPL-2001-14; Jan. 18, 2001, 19 pages.

* cited by examiner

*Primary Examiner*—William C Vaughn, Jr.
*Assistant Examiner*—Thomas Richardson
(74) *Attorney, Agent, or Firm*—Blakely, Sokoloff, Taylor & Zafman, LLP

(57) ABSTRACT

A mobile computer system hosts mobile application and a collaboration module. The collaboration module is adapted to enable the mobile application to communicate with a further mobile application, hosted on a further mobile computer system, and to access functionality of an enterprise application, hosted on an enterprise system.

32 Claims, 7 Drawing Sheets

84

```
┌─────────────────────────────────────────┐
│ 120  MULTIPLE USERS AGREE TO UTILIZE AT LEAST ONE │
│      MOBILE APPLICATION, AND PERFORM SELECTION OF THE │
│      SELECTED MOBILE APPLICATION ON RESPECTIVE MOBILE │
│      DEVICES                             │
└─────────────────────────────────────────┘
                    ↓
┌─────────────────────────────────────────┐
│ 122  EACH OF THE MULTIPLE MOBILE DEVICES DOWNLOADS │
│      MISSING APPLICATION COMPONENTS FROM RESPECTIVE │
│      ENTERPRISE BACKENDS (OR OTHER TRUSTED │
│      COMPONENT PROVIDERS)                │
└─────────────────────────────────────────┘
                    ↓
┌─────────────────────────────────────────┐
│ 124  DEPLOYED INSTANCE OF THE SELECTED APPLICATION ON │
│      EACH MOBILE DEVICE CUSTOMIZED ACCORDING TO │
│      POLICIES DOWNLOADED FROM RESPECTIVE ENTERPRISE │
│      BACKENDS                            │
└─────────────────────────────────────────┘
                    ↓
┌─────────────────────────────────────────┐
│ 126  DEPLOYED INSTANCE OF THE SELECTED APPLICATION ON │
│      EACH MOBILE DEVICE LAUNCHES AND START │
│      HANDSHAKE PROTOCOLS WITH OTHER MOBILE DEVICES │
└─────────────────────────────────────────┘
                    ↓
                 128 ( END )
```

FIGURE 5

MOBILE COLLABORATIVE PEER-TO-PEER BUSINESS APPLICATIONS

FIELD OF THE INVENTION

The present invention relates generally to the field communications and process automation, and in one exemplary embodiment, to a system deploying mobile collaborative peer-to-peer business applications.

BACKGROUND OF THE INVENTION

Currently, mobile applications that execute on mobile devices operate in one of a number of different modes. In a first off-line mode, the mobile applications operate as stand-alone applications on a mobile device, without any connection to a network. In a second online mode, mobile applications may operate with connections to one or more services, for example, offered by an enterprise backend, via a network (e.g., the Internet or an intranet). Examples of mobile applications that are able to operate in such online mode include mobile web browser applications that establish connectivity to a web application server, for example, forming part of an enterprise backend. In a third hybrid online/off-line mode, mobile applications may perform certain operations locally, and then later synchronize with another system, once a connection is established. For example, a mobile e-mail application may enable a user to author e-mails, which are then communicated to a backend e-mail server when the mobile device establishes a connection to such an e-mail server.

Mobile business users often use the online or hybrid modes of usage to access services offered by corporate enterprise backends. Such access may be viewed as establishing a business-to-employee (B2E) domain, in which corporate users are, via mobile devices, provided access to functionality offered by an enterprise backend.

Business applications today typically operate in a business-to-employee (B2E) or business-to-business (B2B) context. The advent of mobile technology has offered new possibilities to extend the business-to-employee (B2E) domain by offering mobile employees access to corporate resources. For example, such mobile technologies enable employees to participate in an enterprise's business processes by mobile applications that span a mobile user's device and the enterprise domain. Mobile technologies that may contribute to the extension of the business-to-employee (B2E) domain include (1) wireless devices, in the form of Personal Digital Assistants (PDAs), notebook computers and smart phones for example, and (2) wireless communication technologies, such as Wireless Local Area Networks (WLANs), and Universal Mobile Telecommunications Systems (UMTS's), a 3G mobile technology that delivers broadband access via mobile telephone networks.

While progress has been made in extending the business-to-employee (B2E) domain, significant technical challenges remain with respect to extending the capabilities of mobile devices beyond this domain.

SUMMARY OF THE INVENTION

According to one aspect of the present invention, there is provided a method to enable collaboration between a first mobile application, hosted on a first mobile device and a second mobile application, hosted on a second mobile device. The method includes establishing first communications between the first mobile application and a first enterprise application via a first network communications link. The first enterprise application is hosted on a first enterprise system, and the first communications enable the first mobile application to access functionality provided by the first enterprise application. Second communications are established between the first mobile application and the second mobile application via a second network communications link, so as to enable collaboration between the first mobile application and the second mobile application via the second network communications link.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 5 is a method, according to an exemplary embodiment, to enable multiple mobile devices to select and launch joint (or collaborative) mobile applications.

DETAILED DESCRIPTION

A method and a system to enable collaboration between mobile business applications are described. In the following description, for purposes of explanation, numerous specific details are set forth in order to provide a thorough understanding of the present invention. It will be evident, however, to one skilled in the art that the present invention may be practiced without these specific details.

As noted above, mobile technologies have enabled the extension of the business-to-employee (B2E) domain into the mobile world, by enabling connectivity between mobile devices and an enterprise backend. One exemplary embodiment of the present invention proposes extending the capabilities of mobile applications into more collaborative scenarios, in which mobile applications span not only the traditional business-to-employee (B2E) domains, but also enable activity and collaboration across multiple business-to-employee (B2E) domains, using an employee-to-employee (E2E) interface, for example. One embodiment of the present invention proposes utilizing peer-to-peer technology to create an employee-to-employee (E2E) interface between mobile applications, executing on respective mobile devices, operated by employees. Further, one exemplary embodiment of the present invention proposes maintaining connectivity between the mobile applications and respective enterprise backends so that the mobile applications may continue to access and utilize the functionality provided by an enterprise backend, while concurrently facilitating collaboration on an employee-to-employee basis.

In summary, in one embodiment, the present invention proposes technologies whereby a mobile device may be equipped so as to enable mobile applications, executing on the mobile device, to collaborate via a connection established between respective mobile devices (e.g., to establish an employee-to-employee (E2E) interface), each of the mobile applications concurrently having access, via a network, to respective enterprise backends (e.g., a business-to-employee (B2E) interface). In this manner, in one embodiment, the collaboration efforts between two mobile devices are able to leverage functionality offered by the respective enterprise backends.

Figure 1:
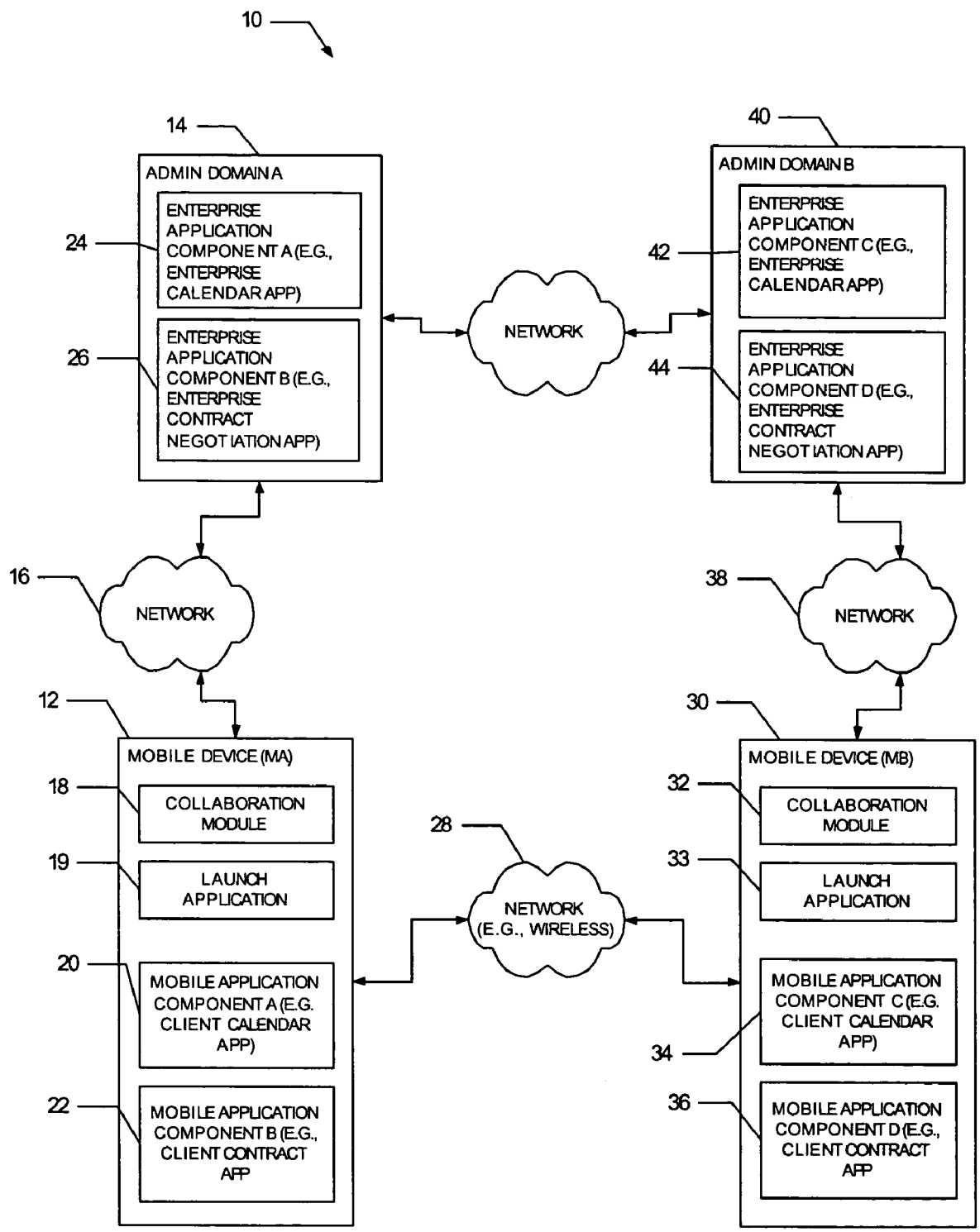
FIG. 1 is a block diagram illustrating a mobile collaborative environment, according to an exemplary embodiment of the present invention, in which multiple mobile devices collaborate, while each maintaining access to respective enterprise backends.

FIG. 1 is a block diagram illustrating a mobile collaborative environment 10, according to an exemplary embodiment of the present invention. Within the mobile collaborative environment 10, a first mobile device 12, for example, operated by a first employee, communicates with an enterprise backend system operating within a first administrative domain 14. These communications occur via a connection established via a network 16. The network 16 may be a wired network (e.g., a Virtual Local Area Network (VLAN) or a Wide Local Area Network (WLAN)), or a wireless network (e.g., a WLAN, Bluetooth network; a GSM network, a UMTS network, an infrared network, a Digital Enhanced Cordless Telephony (DECT) network or a HomeRF network, etc.).

The mobile device 12 is shown to host and execute a collaboration module 18 that establishes and controls communications with one or more further mobile devices, and also with an enterprise backend. Accordingly, the collaboration module 18, in the exemplary embodiment, provides the B2E and one or more E2E interfaces for the mobile device 12. Also hosted and executed on the mobile device 12 are one or more mobile application components, in the exemplary form of a client calendar application 20 and a client contract negotiation application 22.

The enterprise backend, maintained at the first administrative domain 14, in the exemplary embodiment, includes multiple enterprise application components, in the exemplary form of a calendar application 24 and a contract negotiation application 26. It will be appreciated that the client calendar application 20 and the server calendar application 24 may be viewed as mobile and enterprise components of a single calendar application. Similarly, the client contract negotiation application 22 and the server contract negotiation application 26 may be viewed as components of a contract negotiation application, these components residing on different devices and communicating via a network.

The first mobile device 12 is furthermore able to communicate with at least a second mobile device 30 via a communication link established over a network 28. In one embodiment, the network 28 is a wireless network (e.g., a WLAN, Bluetooth, GSM, UMTS, Infrared, DECT or HomeRF network). The second mobile device 30 is also shown to host and execute a collaboration module 32, as well as mobile application components 34 and 36. The mobile application components 34 and 36 may, in one embodiment, also have access to corresponding enterprise application components 42 and 44, forming part of an enterprise backend hosted at a second administrative domain 40, accessible by a user of the second mobile device 30. To this end, the mobile device 30 is shown to communicate with the enterprise backend at the administrative domain 40 via a network 38, which may be, for example, of any one of the network types discussed above.

The enterprise backends hosted at the first and second administrative domains 14 and 40 may further communicate via a network 46 (e.g., the Internet) so as to enable an exchange of information between these enterprise backends. For example, various enterprise application components hosted within each of the domains 14 and 40 may perform trans-enterprise communications for the purposes of facilitating and supporting collaboration between corresponding mobile application components, executing on the first and second mobile devices 12 and 30.

In one embodiment, the mobile application components hosted on the mobile devices 12 and 30 may communicate via web services (e.g., SOAP protocols). These communications may be facilitated via the collaboration modules 18 and 32.

Further, the collaboration modules 18 and 32, in one embodiment, offer mutual discovery of services provided by mobile application components hosted on the respective mobile devices. This discovery may be based on a Web services description language.

Further, the collaboration modules 18 and 32 may enable mobile application components to be installed on the respective mobile devices 12 and 30, so as to enable collaboration between users of these devices, in the event that required mobile application components are absent. The required mobile application components may, for example, be retrieved from an enterprise backend accessible by a particular collaboration module 18 or 32, an enterprise backend not necessarily associated with a particular collaboration module (e.g., the collaboration module 18 may cause the installation of a mobile application component from the enterprise backend resident at the administrative domain 40), or from a third-party service provider.

In a further embodiment, the collaboration module 18 enables the mobile application components to delegate rights, based on a transfer of security credentials, to mobile application components hosted on further mobile devices. For example, the client calendar application 20 may delegate rights, assuming an appropriate transfer of security credentials, to the client calendar application 34 so as to enable the client application 34 to access calendar information and other calendar services provided by the enterprise calendar application 24, resident within the administrative domain 14. Similarly, the client calendar application 20 may be delegated rights to access services and information provided by the enterprise calendar application 42, resident on the second administrative domain 40.

Each of the mobile devices 12 and 30 also hosts a respective launch application 19 and 33 (or pad). A launch application discovers and investigates locally installed and pre-configured mobile applications and services that are available to the mobile device (e.g., from an enterprise backend).

The transfer of security credentials may, in various embodiments, be defined in an application or a resource-specific manner. Furthermore, the security credentials need not necessarily be statically "preinstalled," but may be created at a pre-assigned lifetime (or validity) in a dynamic manner utilizing a respective mobile device.

Figure 2:
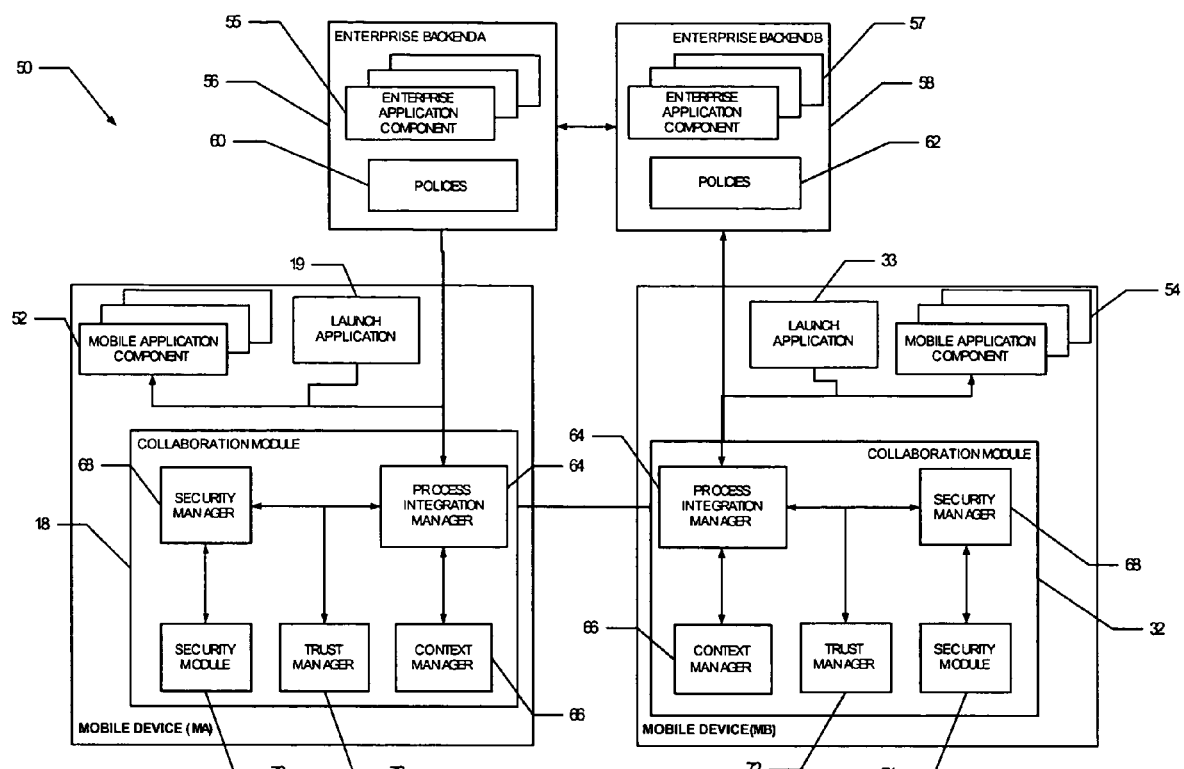
FIG. 2 is a block diagram providing architectural details regarding collaborative components, according to an exemplary embodiment of the present invention, which may be deployed within a mobile collaborative environment.

FIG. 2 is a block diagram providing further architectural details regarding a collaboration module 18, according to an exemplary embodiment of the present invention. While the collaboration modules 18 and 32 are illustrated in FIGS. 1 and 2 as being separate software modules, it will readily be appreciated that these collaboration modules may be integrated within each of the instances of the mobile application components, and need not necessarily be distinct modules that service a number of mobile application components resident on any one mobile device.

Returning to FIG. 2, the collaboration module 18 is shown to include a process integration manager (PIM) 64, which is primarily responsible for coordinating communications between mobile application components 52, resident on the mobile device 12, enterprise application components 55 forming a part of an enterprise backend 56, and user and peer mobile application components 54, installed on a further mobile device (e.g., the second mobile device 30). The process integration manager 64, in one embodiment, functions as a central coordinating hub on a mobile device. Further, the operations of the process integration manager 64 may be defined by a number of policies 60 maintained on an associated enterprise backend 56. In one embodiment, the policies may contain, inter alia, rules defining the behavior of the process integration manager 64 with respect to determining and setting up the trust relationships with peer process integration managers and mobile application components; protection mechanisms to be utilized by a security manager 68 associated with the process integration manager 64; data to be determined by a context manager 66 associated with the process integration manager 64; the type and characteristics of security modules 70 utilized by the process integration manager 64; and the choreography of the process and interactions between applications, devices, users and peers.

The context manager 66 is shown to communicate with the process integration manager 64, and is responsible for determining external context information pertinent to a mobile device 12. For example, the context manager 66 may be responsible for determining location, available peer devices and objects, temperature, acceleration and proximity to peer devices and objects.

A trust manager 72 is responsible for evaluating a "trust" context of a hosting mobile device 12 and an associated user. In one embodiment, the trust manager 72 may evaluate trust based on a number of factors, for example, the context information determined by the context manager 66, and credentials received from other mobile devices (e.g., peer devices), peer users, and associated enterprise backends.

The security manager 68 is responsible for security measures to protect communications between mobile devices (e.g., between mobile devices 12 and 30) and between mobile devices and their enterprise backends (e.g., between the mobile device 12 and its associated enterprise backend 56).

The security module 70 (e.g., a smart card, tamper-resistant Integrated Circuit (IC) mounted on a device, a software token, or combination of the above) contains credentials needed by the security manager 68 and the trust manager 72 to perform certain of the functions described herein.

Discussions regarding the operations of the various components of the mobile collaborative environment 10 will now be provided with reference to FIGS. 3-6.

Figure 3:
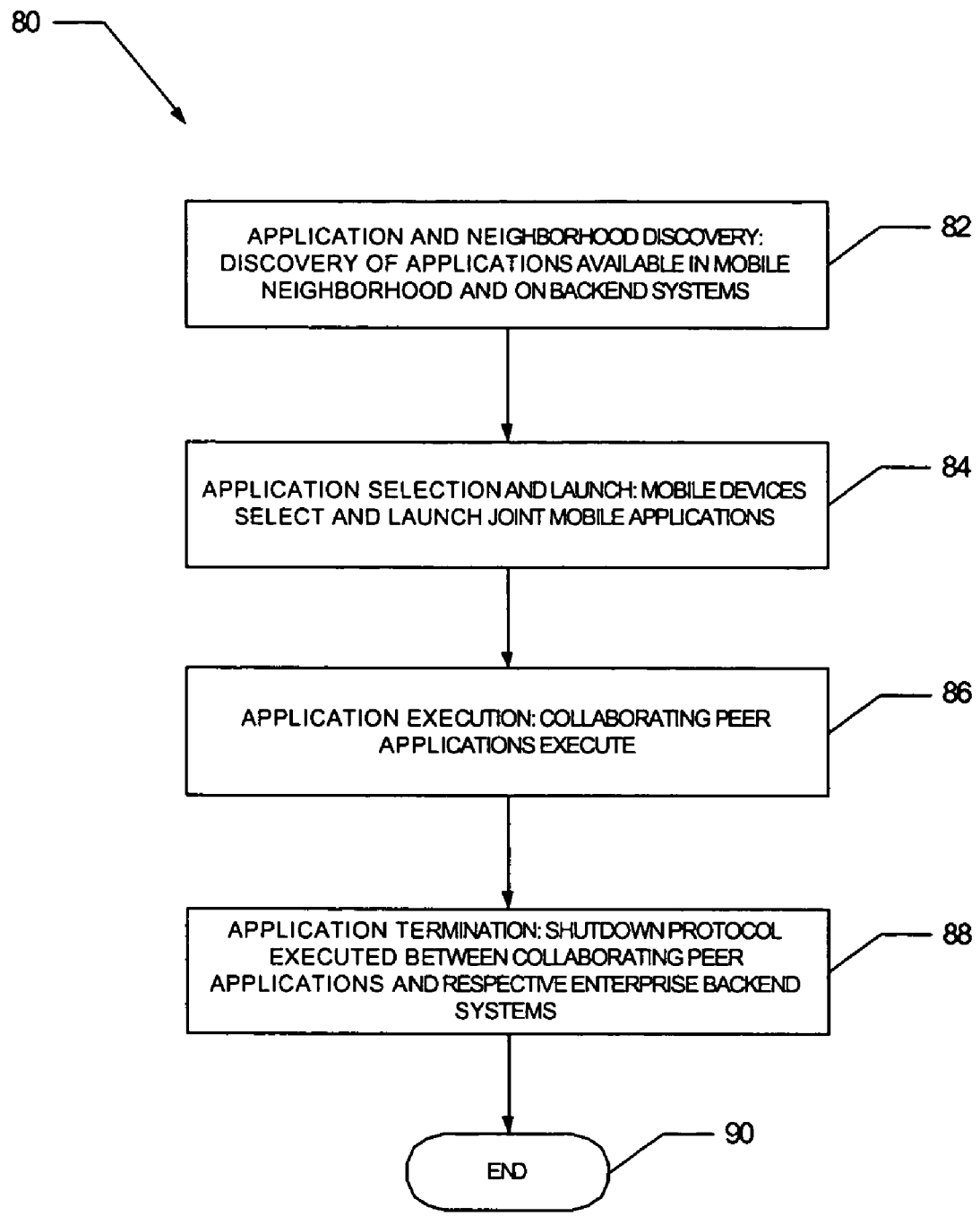
FIG. 3 is a flowchart illustrating a method, according to an exemplary embodiment of the present invention, to enable collaboration between multiple mobile applications, hosted on respective mobile devices, within a mobile collaborative environment.

FIG. 3 is a flowchart illustrating a method 80, according to an exemplary embodiment, to enable collaboration between a first mobile application and multiple other mobile applications, as well as enabling the first mobile application to access at least an enterprise backend associated therewith.

FIG. 3 accordingly illustrates an application life cycle that commences at block 82 with an application and neighborhood discovery phase. This phase is concerned with the discovery and identification of mobile application components, installed on a particular mobile device and peer mobile devices, which may be utilized for collaborative purposes. The discovery and identification of such mobile application components may, for example, depend on services available in a mobile neighborhood and from an enterprise backend.

At block 84, an application selection and launch phase is performed. Specifically, during this phase, each of the users of multiple mobile devices may select and launch joint mobile application components so as to enable collaborative operations.

At block 86, an application execution phase is performed, this phase enabling collaboration utilizing peer applications, these peer applications potentially being distributed across an enterprise backend and a mobile device, and the collaborative communications between the mobile devices (e.g., via an E2E interface).

At block 88, an application termination phase includes the execution of a shutdown protocol between the collaborating peer applications and respective enterprise backend systems. The method 80 then terminates at block 90.

Figure 4:
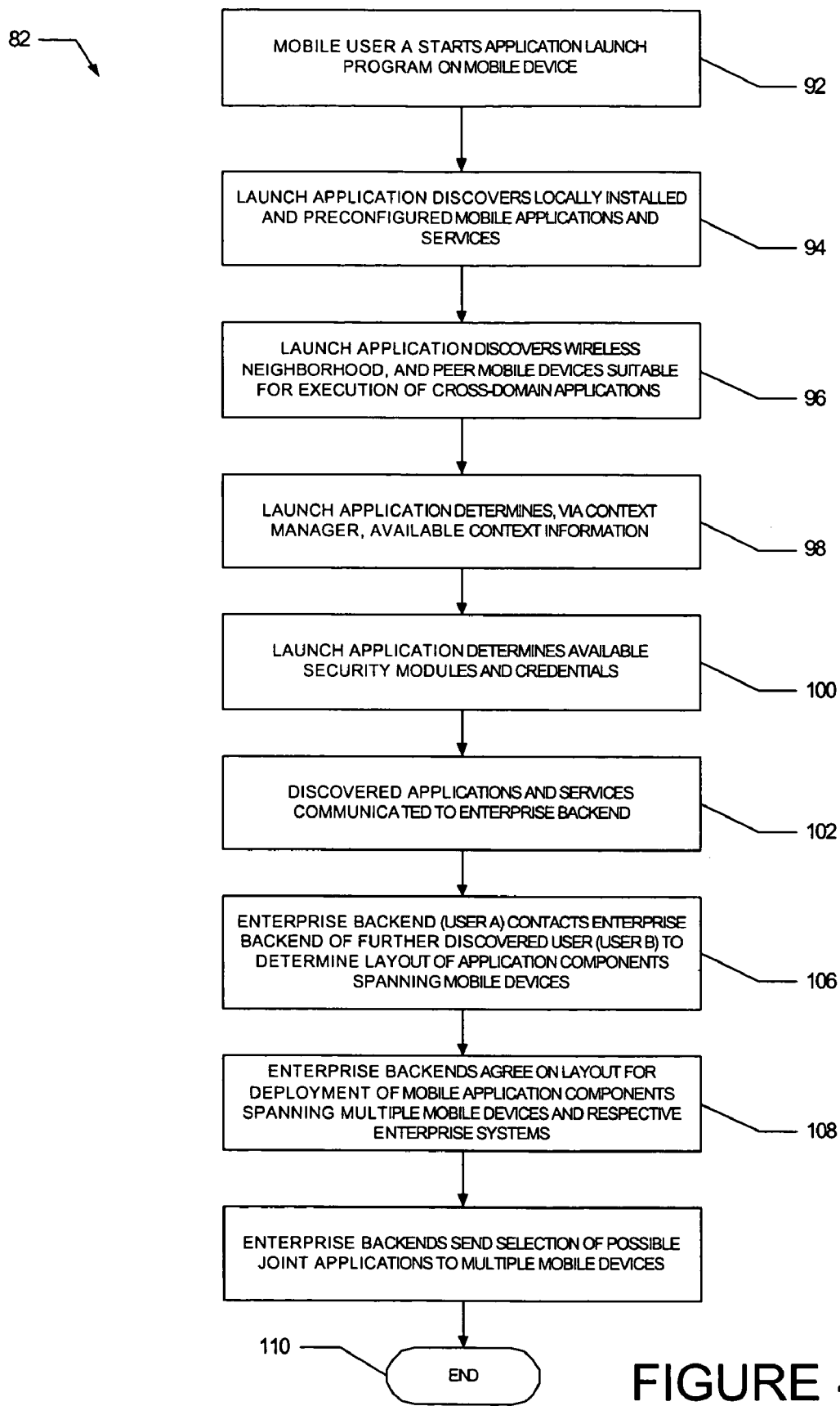
FIG. 4 is a flowchart illustrating a method, according to one embodiment, to operate a mobile device to perform application and neighborhood discovery via a network (e.g., a wireless network).

FIG. 4 is a flowchart illustrating the operations that may be performed during the application and neighborhood discovery phase 82, according to one embodiment. The phase 82 commences at block 92, with the user of a mobile device 12 starting the launch application 19 (or pad). At block 94, the launch application 19 discovers and investigates locally installed and pre-configured mobile applications 52 and services that are available to the mobile device (e.g., from an enterprise backend 56).

At block 96, the launch application 19 discovers and investigates a wireless neighborhood (e.g., identifying a wireless network 28 by which the mobile device 12 may communicate with other mobile devices, and also discovers peer mobile devices, such as the second mobile device 30, suitable for the execution of a cross-device mobile application).

At block 98, the launch application 19 determines, utilizing the context manager 66, available context information, examples of which were provided above. At block 100, the launch application 19 identifies security modules 70 associated with the mobile device 12, and also credentials that are available to the user of the mobile device 12.

At block 102, the launch application 19 communicates the information, discovered at blocks 96-100, to an associated enterprise backend 56.

At block 104, the enterprise backend 56 (e.g., of the discovering mobile device 12) contacts the enterprise backend 58 of a discovered mobile device 30, to determine a possible layout of application components spanning the discovering mobile device 12 and the discovered mobile device 30. It will be appreciated that the communication between the enterprise backends 56 and 58 may be via the network 46.

The respective enterprise backends 56 and 58 having discovered mobile applications that span the mobile devices 12 and 30, at block 106, the respective enterprise backends 56 and 58 agree on a layout for deployment of mobile applications spanning multiple mobile devices (e.g., the discovering mobile device 12 and the discovered mobile device 30). In one embodiment, the layout of the applications may extend beyond merely the mobile applications, but may extend to both mobile and enterprise application components. The components may extend to a layout of both mobile and enterprise application components.

At block 108, each of the respective enterprise backends 56 and 58 sends a selection of possible joint applications to be executed on the respective mobile devices 12 and 30. Again, the (or collaborative) applications included in the selection may each have both mobile application and enterprise application components. The phase 82 then terminates at block 110.

FIG. 5 is a flowchart illustrating the operations that may be performed during the application selection and launch phase 84, discussed briefly above with reference to FIG. 3. The phase 84 commences at block 120, with multiple users (e.g., users of each of the mobile devices 12 and 30) agreeing to utilize at least one of the joint applications identified in the selection provided by the enterprise backends at block 108. The users having agreed to utilize at least one of the applications, the users then each perform a selection of at least one selected application, in the exemplary embodiment a mobile application component on the respective mobile devices 12 and 30. As noted above, an instance of the selected application may be a completely mobile application, and accordingly be completely resident on a mobile device. Alternatively, the selected application may include mobile application components, resident on a mobile device, and enterprise application components, resident on an enterprise backend. In a third scenario, the selected application may be wholly resident on an enterprise backend, with the mobile devices merely providing an interface within the E2E domain by which the users of the mobile devices 12 and 30 can collaborate utilizing the enterprise application. For the purposes of the exemplary embodiment discussed below, it is assumed that the selected application has at least a mobile application component that performs certain operations on a mobile device. However, it will be appreciated that, aside from interface functions, application functions may be performed almost exclusively in the enterprise backend, in certain scenarios.

Moving on to block 122, each of the mobile devices 12 and 30 (if necessary) downloads missing application components from their respective enterprise backends, or other trusted component providers. Specifically, information identifying missing application components is provided to the mobile devices 12 and 30 by their respective backends, the enterprise backends having identified such missing application components when reaching agreement regarding the layout for deploying the mobile application of an application spanning the two mobile devices and associated enterprise backends.

At block 124, each of the mobile devices 12 and 30 customizes a deployed instance of an application according to policies 60 downloaded from the enterprise backends 56 and 58. Specifically, the policies may be utilized by:

(a) The process integration manager (PIM), which is responsible for the coordination of the further execution of the collaborative (or joint) application on the mobile devices 12 and 30 and/or the enterprise backends 56 and 58;

(b) The security manager, which is responsible for the enforcing of the required security measures;

(c) The trust manager, which is configured according to a policy that controls the degree of flexibility and freedom accorded to a user to manage trust relationships with peer mobile devices that are specified by an appropriate enterprise backend. For example, the enterprise backend 56 might store policies 60 that apply in general, but which offer the user of the mobile device 12 a degree of flexibility to assign trust levels to a further peer mobile device 30, based on the user's personal judgment. Accordingly, the trust manager 72 will query the user to select among several possible behaviors in a certain situation to control operations (e.g., the flow of information between the peer mobile devices 12 and 30).

At block 126, a deployed instance of the selected application launches on each of the peer mobile devices 12 and 30, and checks protocols with mobile devices, via the respective process integration manager 64, in order to achieve mutual synchronization.

Figure 6:
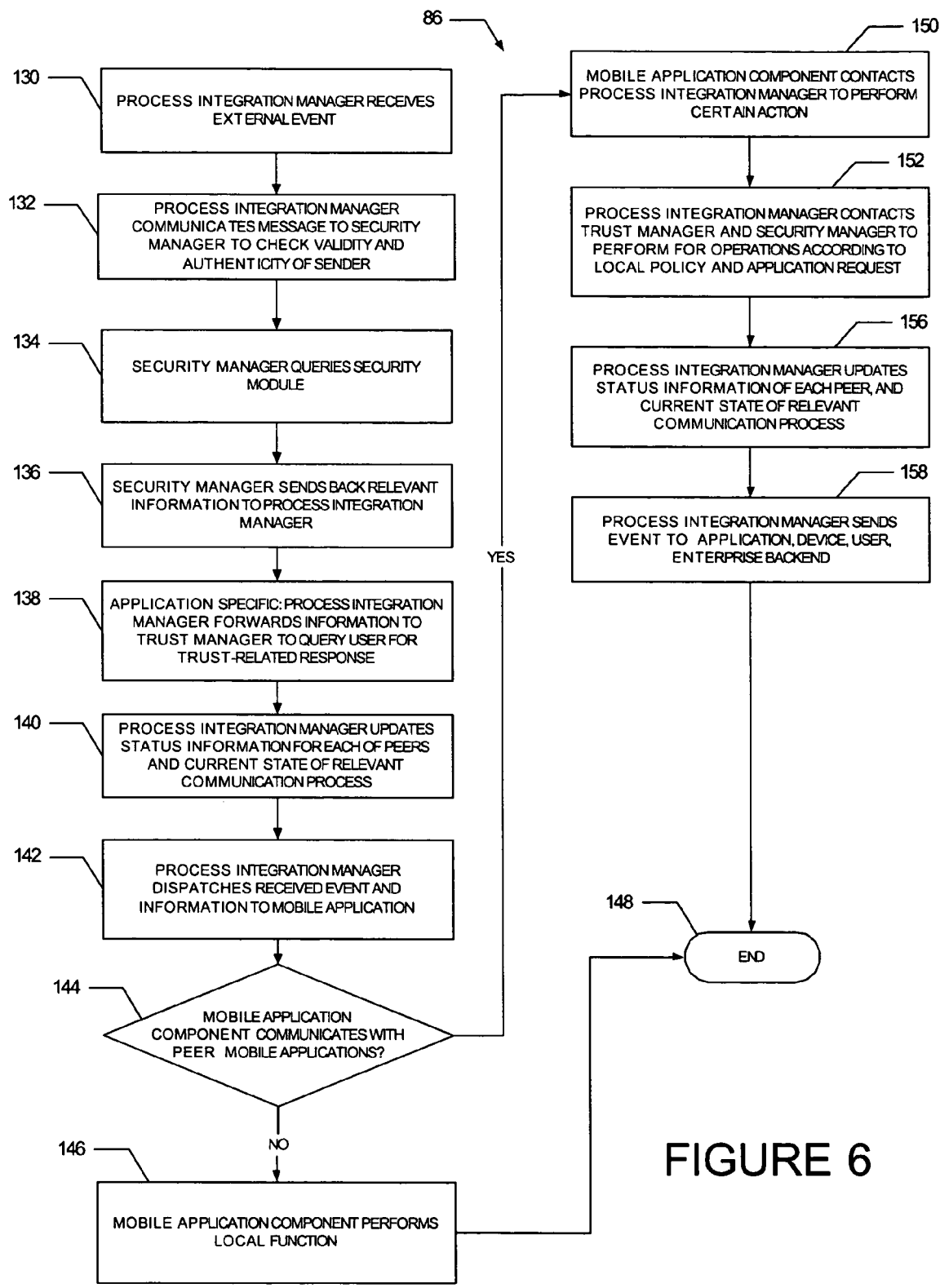
FIG. 6 is a method, according to one embodiment, to enable collaborative peer-to-peer mobile applications to collaborate within a mobile collaborative environment.

FIG. 6 is a flowchart illustrating details of operations that may be performed during the application execution phase 86, briefly described above with reference to FIG. 3. The phase 86 commences at block 130. The operations of the application execution phase 86 are described below within the context of the mobile device 12.

At block 130, the process integration manager 64 of the mobile device 12 receives an external event (e.g., triggered by a message received by a user interface of the mobile device 12, or from some external system such as the enterprise backend 56 or a further mobile device 30).

At block 132, the process integration manager 64 communicates the message to the security manager 68 to check the validity and authenticity of the sender. At block 134, the security manager 68 may optionally query the security module 70 for certain information, or may invoke the security module 70 to perform certain security critical operations.

At block 136, the security manager 68 sends validity and authenticity information back to the process integration manager 64, indicating the validity and the authenticity of the sender.

At block 138, dependent upon the selected application, the process integration manager 64 forwards the validity and authentication information to the trust manager 72. The trust manager 72 in turn may query the user of the mobile device 12 for a trust-related response. For example, the trust manager 72 may query the user to determine what level of access to grant to a collaborating user of the mobile device 30, with respect to the selected application.

At block 140, the process integration manager 64 further updates status information for each of the peer mobile devices 30, and also updates status information indicating the current state of a communication process between the peer mobile devices 12 and 30. For example, each of the peer mobile devices 12 and 30 may record the state of communication processes as so-called finite state machines (FSM). In one embodiment, each of these finite state machines models issues, such as network connectivity, proximity, availability of core services and thus provides a more general view on the "status" of the communication between devices 12 and 30. This status captures an assumption that one mobile device makes about the status of a peer device, and is "updated" as soon as new information about the network is received, or when information received from the peer device is available, that results in a change in a captured assumption.

At block 142, the process integration manager 64, having performed the above-described trust and security operations, forwards the external event, received at block 130, to the appropriate mobile application component 52 resident on the mobile device 12.

At decision block 144, the mobile application component 52 that receives the event performs an event-driven operation (e.g., a computation). Depending on the mobile application component 52, the operation may be wholly contained within the mobile device 12, or alternatively may require communication with a peer mobile device 30, or the enterprise backend 56. Accordingly, a determination is made at decision block 144 whether the event-driven operation performed by the mobile application component 52 requires communication with the peer mobile application component 54 of a peer mobile device 30. If not, the mobile application component 52, at block 146, performs the local function, and the application execution, with respect to that particular external event, terminates at block 148.

On the other hand, should the event-driven operation performed by the mobile application component 52 require communication with a peer mobile application component 54, the mobile application component 52 contacts the process integration manager 64 to perform a certain communications action. The process integration manager 64, in turn, contacts the trust manager 72 and the security manager 68 to perform trust and security operations according to policies (e.g., a policy 60) and the application request. The trust and security operations performed at block 152 may depend on the current status of a process being executed by the mobile collaborative application component 52.

At block 156, the process integration manager 64 then updates status information with each of its peer process integration managers 64, for example, hosted on peer mobile devices 30. The status updates may include the current state of communication processes between peer mobile devices 12 and 30.

At block 158, the process integration manager 64 sends an event to a peer application, device, user or backend system to thereby effect the communications between peer mobile devices 12 and 30, or between the mobile device 12 and an associated enterprise backend 56. The phase 86 then ends at block 148.

The operation of exemplary applications, within the context of an exemplary mobile collaborative environment 10, will now be described. Referring to FIG. 1, where the selected application is a calendar application, for example, having a client calendar application component 20 and an enterprise calendar application component 24, an embodiment of the present invention may be utilized to enable "calendar searching." For example, the calendars of two or more employees of the same (or different) companies may be searched for a suitable date for a meeting. Consider that the users of mobile devices 12 and 30, as illustrated in FIG. 1, are seeking to find a mutually acceptable date for a future meeting. Both of the users are connected via their respective mobile devices 12 and 30 to respective enterprise backends, and specifically enterprise calendar application components 24 and 42. Further, the users have established a link (e.g., a wireless link) between the respective mobile devices 12 and 30. The users may also have downloaded (e.g., from the enterprise backends or from a third-party service provider) an application that is able to scan a number of calendars, and to search for a mutually available date, according to certain preferences recorded for each of the employees in their respective versions of the calendar application.

After each of the employees have entered their preferences and visibility parameters, with respect to their calendars, and I into the client calendar application components 20 and 34, the components 20 and 34 generate a selected instance of the calendar application to find the mutually acceptable date. The selected instance of the application uses credentials received from all employees, establishes connections to each of the enterprise backends associated with the employees and performs a calendar search for the date. The selected instance of the calendar application then sends the results of the query back to each of the client calendar application components 20 and 34. Each of the users of the mobile devices 12 and 30 is then able to edit the selection, and provide further availability and preference information. This availability and preference information is then sent back to the selected calendar application. This process may then continue until each of the employees has agreed upon acceptable meeting parameters (e.g., date and venue). The selected calendar application, or alternatively each instance of the client calendar application component, makes appropriate entries that are recorded in the enterprise calendar application components 24 and 42.

In a further use scenario, employees from different companies may be in a face-to-face meeting in order to finalize the details of a contract between the different companies. Different employees may, utilizing respective mobile devices, access backend enterprise contract negotiation application components 14 and 40 in order to look up pertinent data (e.g., discount information, price lists, sales figures, product lists, product configurations, etc.). Further, employees of a particular company (e.g., operating from administrative domain 14) may allow employees from a different company (e.g., operating from administrative domain 40) to access relevant data within the administrative domain 14. Accordingly, in this manner, employees of one company may grant employees of another company access to certain information, maintained in their enterprise backends, via peer mobile devices, which provide an E2E, interface via which such access is facilitated.

Continuing the above contract negotiation example, the employees from the different companies may then, in a collaborative manner, compile a final contract that is not only a paper document, but rather an electronic contract that contains all the information about the actual artifacts to be exchanged. Here, the meeting could end and both could then trigger internal approval procedures (e.g., via work-flow systems forming part of the respective enterprise backends).

Further, if each of the employees is authorized to sign and finalize the contract, this could initially occur utilizing digital signatures. The electronic contract description could further directly trigger actual procurement process between the involved parties. Accordingly, this could result in a significant saving in time and resources.

Figure 7:
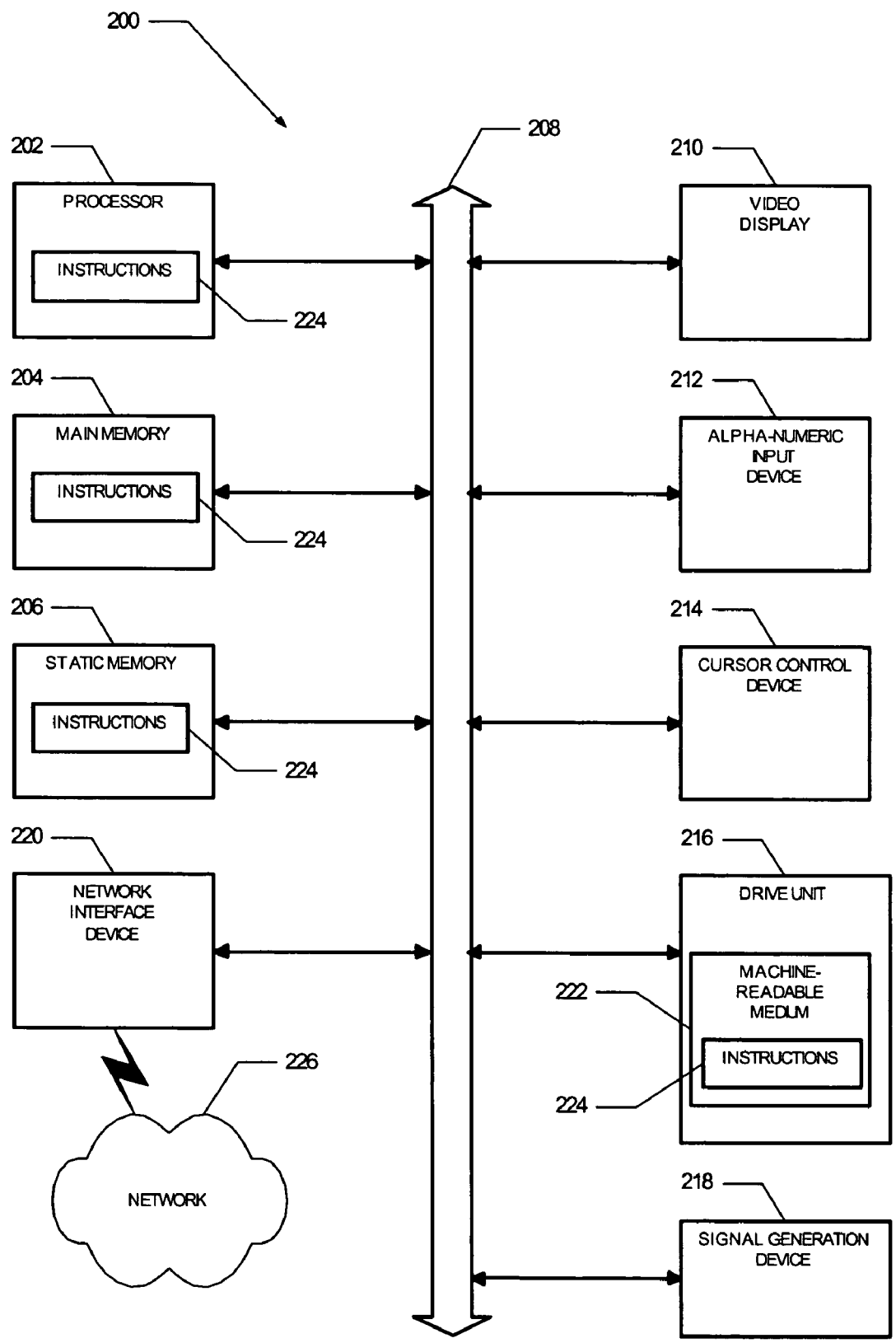
FIG. 7 is a block diagram illustrating a machine, in an exemplary form of a computer system, which may store and execute a set of instructions to automatically perform at least some of the operations of the exemplary methods described herein.

FIG. 7 shows a diagrammatic representation of machine in the exemplary form of a computer system 200 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, and optical and magnetic media.

Thus, a method and a system to enable collaboration between mobile business applications have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system including:
    a mobile application, hosted on a mobile device, missing a first and a second component of the mobile application;
    a collaboration module, hosted on the mobile device, to enable the mobile application to communicate with a further mobile application, hosted on a further mobile device, by accessing the first missing component of the mobile application from an enterprise system associated with the mobile device; and
    a further enterprise system, associated with the further mobile device, enabled to communicate with the mobile device via the enterprise system, wherein allowing the mobile device to access the second missing component of the mobile application from the further enterprise system via the enterprise system,
    wherein the first and the second missing mobile application components, accessed from the enterprise system and the further enterprise system respectively, enable the mobile device via the collaboration module to communicate with a further collaboration module hosted on the further mobile device on a peer to peer basis.

2. The system of claim 1, wherein the collaboration module is adapted to communicate with a further collaboration module, hosted on the further mobile device, on a peer-to-peer basis to enable the communication of the mobile application with the further mobile application.

3. The system of claim 1, wherein the collaboration module is adapted to communicate with the further enterprise system having a further enterprise application, associated with the further mobile application.

4. The system of claim 1, wherein the collaboration module is operable to enable a delegation of resource access rights based on a communication of security credentials.

5. The system of claim 4, wherein the mobile collaboration module is operable to enable the delegation of resource access rights from the mobile application, hosted on the mobile device, to the further mobile application, hosted on the further mobile device.

6. The system of claim 4, wherein the security credentials are defined in at least one of an application-specific manner and a resource-specific matter.

7. The system of claim 4, wherein the security credentials are dynamically created to facilitate the delegation of the resource access rights to a further collaboration module associated with the further mobile device.

8. The system of claim 1, wherein the collaboration module is to perform an automated context discovery operation to discover context information pertaining to an environment in which the mobile device is operating.

9. The system of claim 8, wherein the context information identifies a local network via which the mobile application communicates with the further mobile application.

10. The system of claim 8, wherein the context information identifies the further mobile device as being in a network neighborhood accessible by the mobile device.

11. The system of claim 10, wherein the context information includes security features and credentials associated with the further mobile device.

12. The system of claim 8, wherein the collaboration module is to communicate the context information to the enterprise system.

13. A method including:
    identifying a first and a second missing application component in a first mobile application of a first mobile device;
    establishing a first communication between the first mobile application and a first enterprise application, via a first network communications link, hosted on a first enterprise system, so as to enable the first mobile application to access the first missing component from the first enterprise system;
    establishing a second communication via a second network communications link between the first enterprise system and a second enterprise system, associated with the second mobile device, so as to enable collaboration between a first enterprise application and a second enterprise application via the second network communications link; and
    accessing the second missing component, by the first mobile device, from the second enterprise system via the first and the second communication links to enable collaboration on a peer to peer basis between the first and the second mobile devices via a third network communications link.

14. The method of claim 13, wherein the establishing of the third network communications link includes performing, at the first mobile device, an automated context discovery operation to discover context information pertaining to an environment in which the first mobile device is operating.

15. The method of claim 14, wherein the context information identifies a local network via which the third network communications link is established.

16. The method of claim 14, wherein the context information identifies the second mobile device as being in a network neighborhood accessible by the first mobile device via the second network.

17. The method of claim 14, wherein the context information includes security information associated with the second mobile device.

18. The method of claim 14, including communicating the context discovery information, collected by the automated context discovery operation, to the first enterprise application via the first communications link.

19. The method of claim 14, including communicating the context discovery information from the first enterprise application to the second enterprise application associated with the second mobile device.

20. The method of claim 13, wherein the first and second enterprise applications identify the first and the second mobile applications as having collaboration components.

21. The method of claim 20, including:
identifying absent collaboration components of the first and second mobile applications, and
communicating the absent collaboration components to the first and second mobile devices, respectively.

22. The method of claim 13, wherein the establishing of the third network communications link includes customizing the first and second mobile applications according to respective policies stored at the first and the second enterprise applications.

23. The method of claim 13, wherein the collaboration between the first mobile application and the second mobile application includes receiving an event at the first mobile application and communicating the event from the first mobile application to the second mobile application.

24. The method of claim 23, wherein the event is received at the first mobile application from a first collaboration module, hosted on the first mobile device.

25. The method of claim 24, wherein the event is communicated from the first mobile application to the second mobile application via the first collaboration module.

26. A mobile computer system including:
application means, hosted and executed on a mobile device of the mobile computer system, for launching a mobile application; and
collaboration means, hosted and executed on the mobile device, for enabling the mobile application to communicate with a further mobile application, hosted on a further mobile device, on a peer to peer basis, and to access a first identified missing component of the mobile application from an enterprise system associated with the mobile device, and to access a second identified missing component of the mobile application from a further enterprise system associated with the further mobile device.

27. A machine-readable medium for storing a set of instructions that, when executed by a machine, cause the machine to perform a method including:
identifying a first and a second missing application component in a first mobile application of a first mobile device;
establishing a first communication between the first mobile application and a first enterprise application, via a first network communications link, hosted on a first enterprise system, so as to enable the first mobile application to access the first missing component from the first enterprise system;
establishing a second communication via a second network communications link between the first enterprise system and a second enterprise system, associated with the second mobile device, so as to enable collaboration between a first enterprise application and a second enterprise application via the second network communications link; and
accessing the second missing component, by the first mobile device, from the second enterprise system via the first and the second communication links to enable collaboration on a peer to peer basis between the first and the second mobile devices via a third network communications link.

28. A system including:
a mobile application missing a first and a second component, the mobile application hosted on a mobile device;
a collaboration module, hosted on the mobile device, to enable the mobile application to communicate with a further mobile application, hosted on a further mobile device, and to download and install the missing first component from an enterprise system associated with the mobile device; and
a further enterprise system, associated with the further mobile device, enabled to communicate with the mobile device via the enterprise system, wherein the mobile device can download and install the missing second component from the further enterprise system,
wherein the downloaded and installed missing first and the second components, of the enterprise application and the further enterprise application respectively, enable the mobile device and the further mobile device to communicate with one another on a peer to peer basis, and wherein the collaboration module includes a context manager for determining temperature, and acceleration of, and proximity to, the further mobile device.

29. The system of claim 28, wherein the collaboration module is operable to enable a delegation of resource access rights based on a communication of security credentials.

30. The system of claim 29, wherein the collaboration module is operable to enable the delegation of resource access rights from the mobile application, hosted on the mobile device, to the further mobile application, hosted on the further mobile device.

31. The system of claim 29, wherein the security credentials are defined in at least one of an application-specific manner and a resource-specific matter.

32. The system of claim 29, wherein the security credentials are dynamically created to facilitate the delegation of the resource access rights to a further collaboration module associated with the further mobile device.

* * * * *

UNITED STATES PATENT AND TRADEMARK OFFICE
CERTIFICATE OF CORRECTION

PATENT NO. : 7,603,466 B2 Page 1 of 1
APPLICATION NO. : 10/894747
DATED : October 13, 2009
INVENTOR(S) : Kilian-Kehr et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Fifth Day of October, 2010

David J. Kappos
*Director of the United States Patent and Trademark Office*